United States Patent
Shavell et al.

(10) Patent No.: US 10,187,485 B1
(45) Date of Patent: Jan. 22, 2019

(54) SYSTEMS AND METHODS FOR SENDING PUSH NOTIFICATIONS THAT INCLUDE PREFERRED DATA CENTER ROUTING INFORMATION

(71) Applicant: Symantec Corporation, Mountain View, CA (US)

(72) Inventors: Michael Shavell, Merrimack, NH (US); John Brockway, Westford, MA (US)

(73) Assignee: Symantec Corporation, Mountain View, CA (US)

( * ) Notice: Subject to any disclaimer, the term of this patent is extended or adjusted under 35 U.S.C. 154(b) by 352 days.

(21) Appl. No.: 14/868,324

(22) Filed: Sep. 28, 2015

(51) Int. Cl.
*H04L 29/08* (2006.01)

(52) U.S. Cl.
CPC .............. *H04L 67/26* (2013.01); *H04L 67/18* (2013.01)

(58) Field of Classification Search
CPC .............................. H04L 67/26; H04L 67/18
See application file for complete search history.

(56) References Cited

U.S. PATENT DOCUMENTS

| | | | | |
|---|---|---|---|---|
| 6,006,264 A * | 12/1999 | Colby | ..................... | H04L 29/06 709/220 |
| 7,188,214 B1 | 3/2007 | Kasriel et al. | | |
| 7,197,433 B2 * | 3/2007 | Patel | ....................... | G06F 9/505 702/188 |
| 7,305,429 B2 * | 12/2007 | Borella | ................... | H04L 29/06 455/433 |
| 7,624,184 B1 * | 11/2009 | Aviani | ................ | H04L 67/2819 709/212 |
| 7,631,098 B2 * | 12/2009 | Boutboul | ................ | H04L 67/10 709/203 |
| 7,650,376 B1 * | 1/2010 | Blumenau | ........... | H04L 67/1008 709/203 |
| 8,496,177 B2 * | 7/2013 | Sevier | ................ | G06K 7/10851 235/462.15 |
| 8,516,193 B1 | 8/2013 | Clinton et al. | | |
| 8,589,543 B2 * | 11/2013 | Dutta | .................. | G06F 11/3006 709/224 |
| 8,732,267 B2 * | 5/2014 | Banerjee | ............. | H04L 67/1097 709/217 |

(Continued)

OTHER PUBLICATIONS

Keith Newstadt, et al.; Systems and Methods for Consolidating Long-Polling Connections; U.S. Appl. No. 14/022,222, filed Sep. 10, 2013.

(Continued)

*Primary Examiner* — Uzma Alam
(74) *Attorney, Agent, or Firm* — Fisher Broyles, LLP

(57) ABSTRACT

The disclosed computer-implemented method for sending push notifications that include preferred data center routing information may include (1) configuring at least one rule for determining which data center out of a plurality of data centers is preferred to serve one or more download requests, (2) identifying a push notification that is configured to prompt a device to download data from a data center within the plurality of data centers, (3) using the rule to select, from the plurality of data centers, a preferred data center to which to route the device, and (4) embedding information about the preferred data center in the push notification sent to the device. Various other methods, systems, and computer-readable media are also disclosed.

20 Claims, 7 Drawing Sheets

(56) References Cited

U.S. PATENT DOCUMENTS

| | | | |
|---|---|---|---|
| 8,943,170 B2* | 1/2015 | Li | H04L 67/322 709/217 |
| 8,984,161 B2* | 3/2015 | Nagpal | G06F 9/5027 709/238 |
| 9,075,660 B2* | 7/2015 | Guo | G06F 9/5027 |
| 9,086,928 B2* | 7/2015 | Tung | G06F 9/5072 |
| 9,229,784 B2* | 1/2016 | DeJana | G06F 9/5077 |
| 9,294,371 B2* | 3/2016 | Tung | G06F 9/5072 |
| 9,300,539 B2* | 3/2016 | DeJana | H04L 41/12 |
| 2004/0133630 A1 | 7/2004 | Coles et al. | |
| 2005/0055437 A1 | 3/2005 | Burckart et al. | |
| 2005/0081039 A1 | 4/2005 | Lee et al. | |
| 2005/0114711 A1 | 5/2005 | Hesselink et al. | |
| 2005/0223163 A1 | 10/2005 | Ogasawara et al. | |
| 2006/0072721 A1 | 4/2006 | Wisniewski | |
| 2007/0160030 A1 | 7/2007 | Cruz | |
| 2008/0127306 A1 | 5/2008 | Blumfield et al. | |
| 2008/0127339 A1 | 5/2008 | Swain et al. | |
| 2008/0225862 A1 | 9/2008 | Wartenberg | |
| 2009/0006641 A1 | 1/2009 | Yaqoob et al. | |
| 2009/0031128 A1 | 1/2009 | French et al. | |
| 2010/0118770 A1 | 5/2010 | Harindranath | |
| 2010/0161714 A1 | 6/2010 | Dongre | |
| 2010/0217801 A1* | 8/2010 | Leighton | H04L 29/12066 709/203 |
| 2010/0274922 A1 | 10/2010 | Reavely | |
| 2011/0010456 A1* | 1/2011 | Saeki | G06F 9/5094 709/226 |
| 2011/0265159 A1 | 10/2011 | Ronda et al. | |
| 2011/0311051 A1 | 12/2011 | Resch et al. | |
| 2012/0054851 A1 | 3/2012 | Piazza et al. | |
| 2012/0131083 A1 | 5/2012 | Goddard et al. | |
| 2012/0289239 A1 | 11/2012 | Luna et al. | |
| 2012/0323990 A1 | 12/2012 | Hayworth | |
| 2013/0055091 A1* | 2/2013 | Dutta | G06F 3/04842 715/736 |
| 2013/0073716 A1* | 3/2013 | DeJana | G06F 9/5077 709/224 |
| 2013/0103646 A1* | 4/2013 | Nagpal | G06F 9/5027 707/659 |
| 2013/0179567 A1* | 7/2013 | Leighton | H04L 29/12066 709/224 |
| 2013/0262681 A1* | 10/2013 | Guo | G06F 9/5027 709/226 |
| 2013/0268673 A1 | 10/2013 | Graham-Cumming | |
| 2013/0339949 A1* | 12/2013 | Spiers | G06F 9/45558 718/1 |
| 2014/0052772 A1 | 2/2014 | Hourselt et al. | |
| 2014/0172961 A1 | 6/2014 | Clemmer et al. | |
| 2014/0280818 A1* | 9/2014 | Kim | H04L 47/125 709/223 |
| 2015/0195347 A1* | 7/2015 | Luft | H04L 67/10 709/203 |
| 2016/0057077 A1* | 2/2016 | Gomatam | H04L 47/788 709/226 |

OTHER PUBLICATIONS

Michael Shavell, et al.; Systems and Methods for Reducing Network Traffic by Using Delta Transfers; U.S. Appl. No. 14/609,465, filed Jan. 30, 2015.

Michael Shavell; Systems and Methods for Protecting Notification Messages; U.S. Appl. No. 14/687,941, filed Apr. 16, 2015.

"XEP-0326: Internet of Things—Concentrators", http://xmpp.org/extensions/xep-0326.html, as accessed Jun. 29, 2013, (Jun. 14, 2013).

"How to disable all notifications and scan progress on Symantec Endpoint Protection (SEP) 12.1 unmanaged client", https://support.symantec.com/en_US/article.TECH172737.html, as accessed Dec. 9, 2014, Article: TECH172737, Symantec Corporation, (Jul. 28, 2012).

"List of HTTP header fields", http://en.wikipedia.org/wiki/List_of_HTTP_header_fields, as accessed Dec. 9, 2014, Wikipedia, (Jul. 24, 2010).

Guzel, Burak, "HTTP Headers for Dummies", http://code.tutsplus.com/tutorials/http-headers-for-dummies--net-8039, as accessed Dec. 9, 2014, (Dec. 9, 2009).

Rouse, Margaret, "payload", http://searchsecurity.techtarget.com/definition/payload, as accessed Dec. 9, 2014, (May 18, 2011).

"What's the difference between a Post and a Put HTTP Request?", http://stackoverflow.com/questions/107390/whats-the-difference-between-a-post-and-a-put-http-request, as accessed Dec. 9, 2014, (Sep. 20, 2008).

"Hypertext Transfer Protocol", http://en.wikipedia.org/wiki/Hypertext_Transfer_Protocol, as accessed Dec. 9, 2014, Wikipedia, (Oct. 8, 2005).

"What information appears in event logs? (Event Viewer)", http://windows.microsoft.com/en-us/windows/what-information-event-logs-event-viewer#1TC=windows-7, as accessed Dec. 9, 2014, Microsoft, (Dec. 15, 2013).

Michael Shavell, et al.; Method or Mechanism for Long Lived Connection Migration; U.S. Appl. No. 14/493,013, filed Sep. 22, 2014.

Michael Shavell, et al.; Method or mechanism for reduction in throughput for HTTP utilizing Long Polling with a distribution; U.S. Appl. No. 14/571,257, filed Dec. 15, 2014.

Geraci, Austin, "GTM vs LTM—Difference between F5 Global & Local Traffic Manager", http://worldtechit.com/gtm-vs-ltm-difference-f5-global-local-traffic-manager/, as accessed Sep. 2, 2015, Worldtech IT, LLC, (Oct. 1, 2014).

\* cited by examiner

SYSTEMS AND METHODS FOR SENDING PUSH NOTIFICATIONS THAT INCLUDE PREFERRED DATA CENTER ROUTING INFORMATION

BACKGROUND

Over the last few decades, the default in information storage has moved from physical hard copies of documents to virtual copies of documents on desktops, laptops, and local servers. Now the default in information storage is moving again, from local copies on endpoint devices to remote copies on cloud servers that can be accessed from many endpoint devices. Storing data on both a cloud server and on one or more user devices requires routinely syncing the data between the server and devices. To complicate the issue, many remote data services involve not just one, but dozens or even hundreds of servers that may each host some portion of a user's data at any given time.

Unfortunately, some traditional systems for syncing data between servers and devices may not always direct the user's device to the most efficient remote server when it is time to sync data. A remote server may be suffering from limited connectivity or may not have a copy of the user's data at the time of the sync request, causing the user's device to initiate multiple attempts at synchronization before successfully downloading the data. Accordingly, the instant disclosure identifies and addresses a need for additional and improved systems and methods for handling push notifications and syncing data.

SUMMARY

As will be described in greater detail below, the instant disclosure describes various systems and methods for sending push notifications that include preferred data center routing information by configuring a set of rules for selecting the optimal data center to serve each download request, using the set of rules to select data centers, and embedding information about selected data centers into the push notifications.

In one example, a computer-implemented method for sending push notifications that include preferred data center routing information may include (1) configuring at least one rule for determining which data center out of a group of data centers is preferred to serve one or more download requests, (2) identifying a push notification that is configured to prompt a device to download data from a data center within the data centers, (3) using the rule to select, from the data centers, a preferred data center to which to route the device, and (4) embedding information about the preferred data center in the push notification sent to the device.

In some examples, configuring the rule for determining which data center is preferred may include configuring a rule that specifies that the preferred data center is required to host the data to be downloaded by the device at the time the push notification is received. In one example, configuring the rule may include configuring a rule that takes into account physical proximity between data centers and devices, identifying the push notification may include determining the geolocation of the device, and using the rule to select the preferred data center may include determining the geolocation of the preferred data center and determining that the preferred data center is in closer physical proximity to the device than at least one other data center. Additionally or alternatively, configuring the rule for determining which data center is preferred may include configuring a rule that specifies a minimum available bandwidth for the preferred data center during a predetermined window of time surrounding an expected time of a download request for the data from the device.

In some embodiments, the computer-implemented method may further include configuring the device to identify the information about the preferred data center embedded in the push notification and route one or more requests to download the data to the preferred data center identified in the push notification. In some examples, the computer-implemented method may further include receiving, at the preferred data center, a download request from the device for the data and serving the download request from the device for the data via the preferred data center.

In one embodiment, using the rule to select the preferred data may include determining, at a data center that identified the push notification, which data center is the preferred data center. In another embodiment, using the rule to select the preferred data center may include determining, at a centralized traffic management console, which data center is the preferred data center and/or determining, at a push notification dispatch service, which data center is the preferred data center.

In one embodiment, a system for implementing the above-described method may include (1) a configuration module, stored in memory, that configures at least one rule for determining which data center out of a group of data centers is preferred to serve one or more download requests, (2) an identification module, stored in memory, that identifies a push notification that is configured to prompt a device to download data from a data center within the plurality of data centers, (3) a selection module, stored in memory, that uses the rule to select, from the data centers, a preferred data center to which to route the device, (4) an embedding module, stored in memory, that embeds information about the preferred data center in the push notification sent to the device, and (5) at least one physical processor configured to execute the configuration module, the identification module, the selection module, and the embedding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) configure at least one rule for determining which data center out of a group of data centers is preferred to serve one or more download requests, (2) identify a push notification that is configured to prompt a device to download data from a data center within the plurality of data centers, (3) use the rule to select, from the data centers, a preferred data center to which to route the device, and (4) embed information about the preferred data center in the push notification sent to the device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
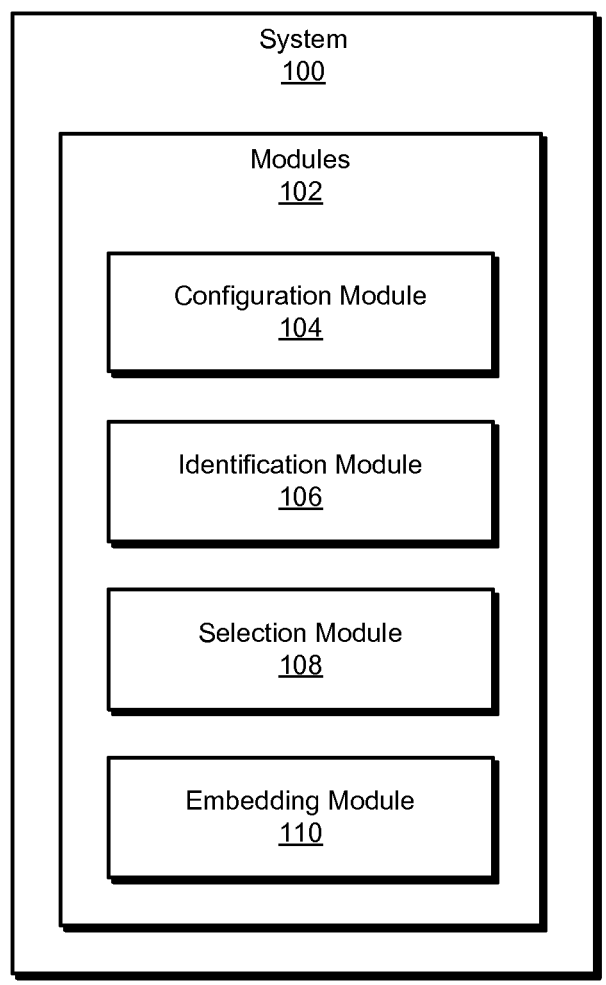
FIG. 1 is a block diagram of an exemplary system for sending push notifications that include preferred data center routing information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for sending push notifications that include preferred data center routing information. As will be explained in greater detail below, by embedding information about the most efficient data center for serving a download request into the push notification that triggers the download request, the systems and methods described herein may enable devices to download data from data centers more efficiently and with less frustration for users.

Figure 2:
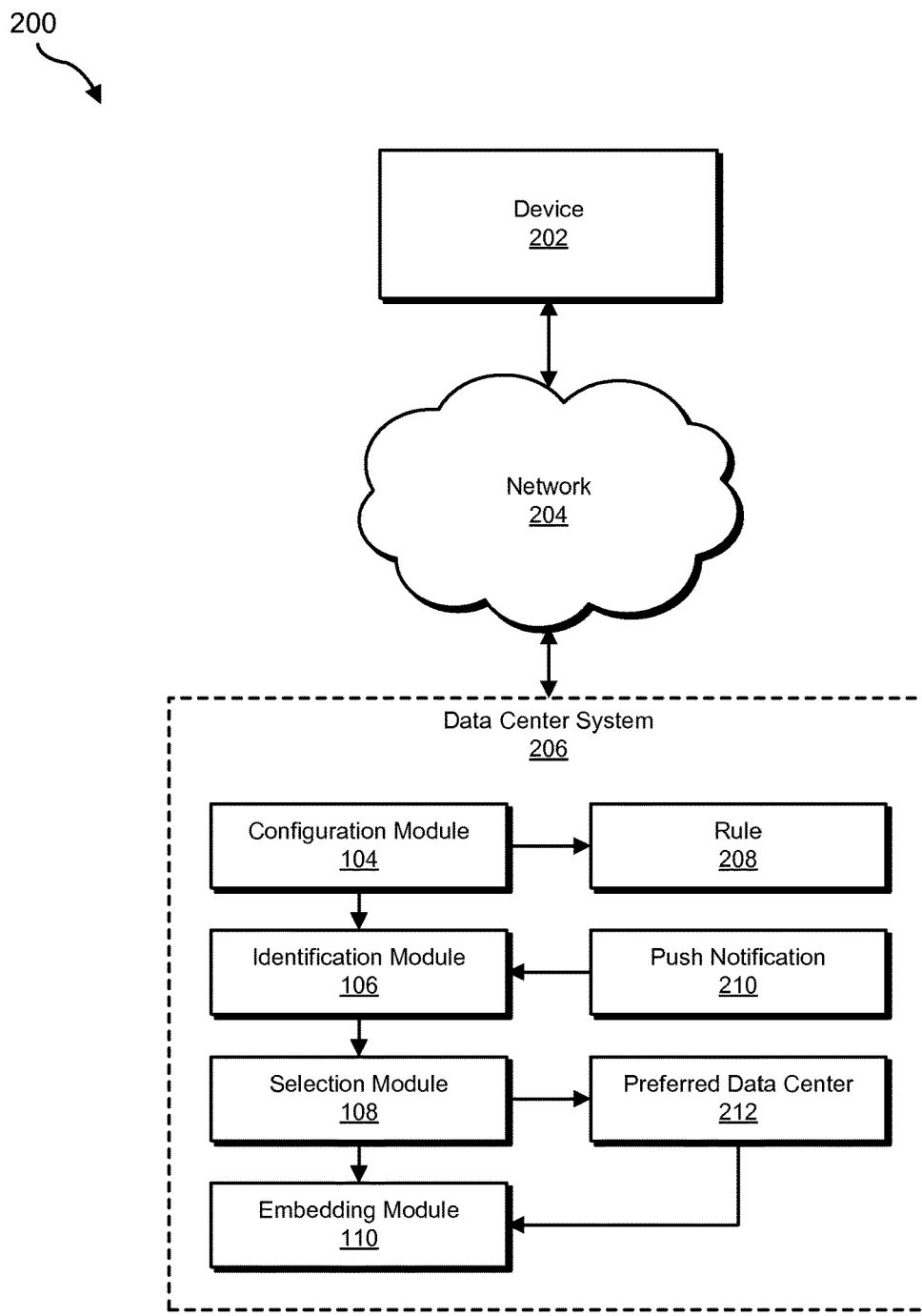
FIG. 2 is a block diagram of an additional exemplary system for sending push notifications that include preferred data center routing information.
Figure 3:
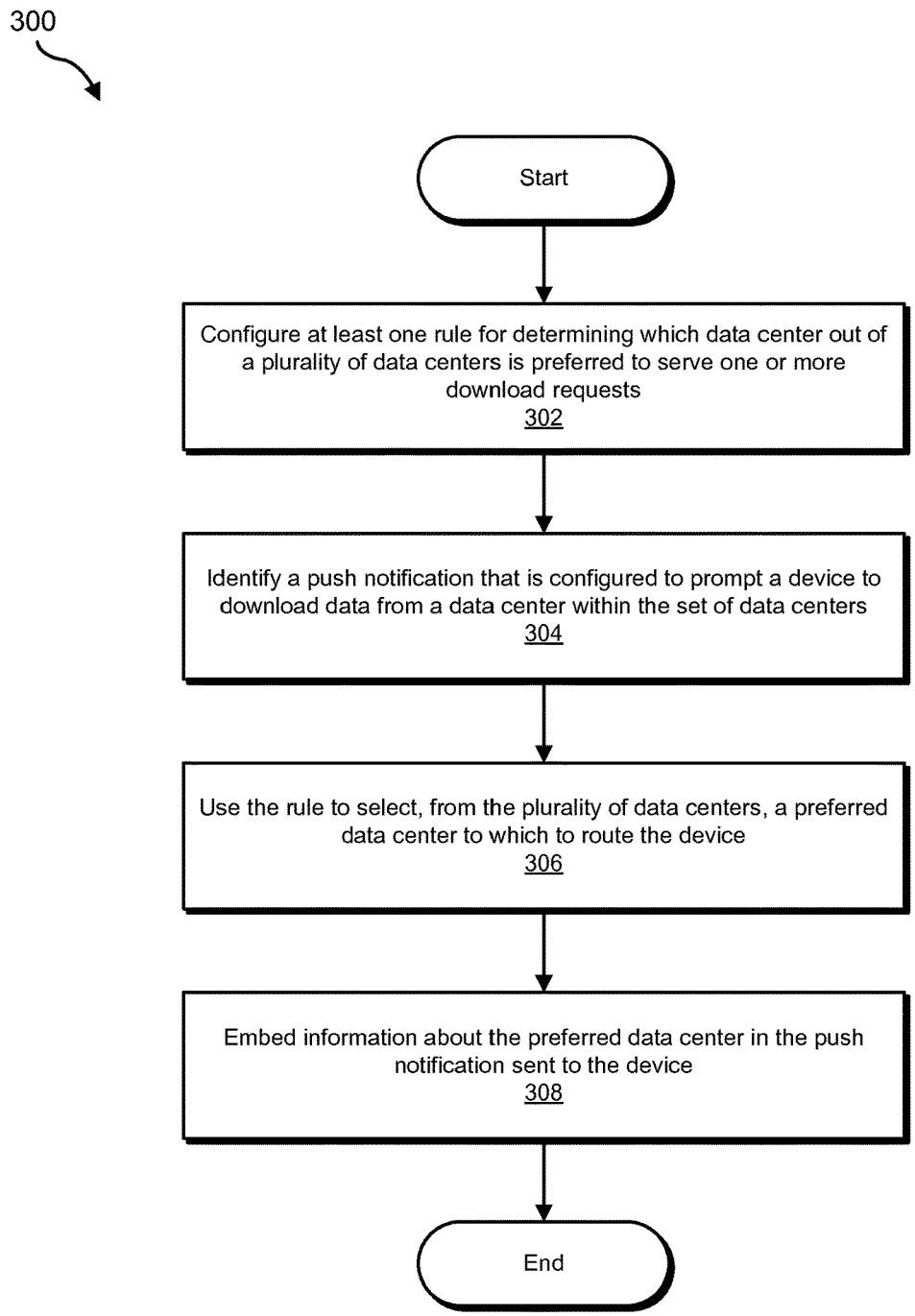
FIG. 3 is a flow diagram of an exemplary method for sending push notifications that include preferred data center routing information.
Figure 4:
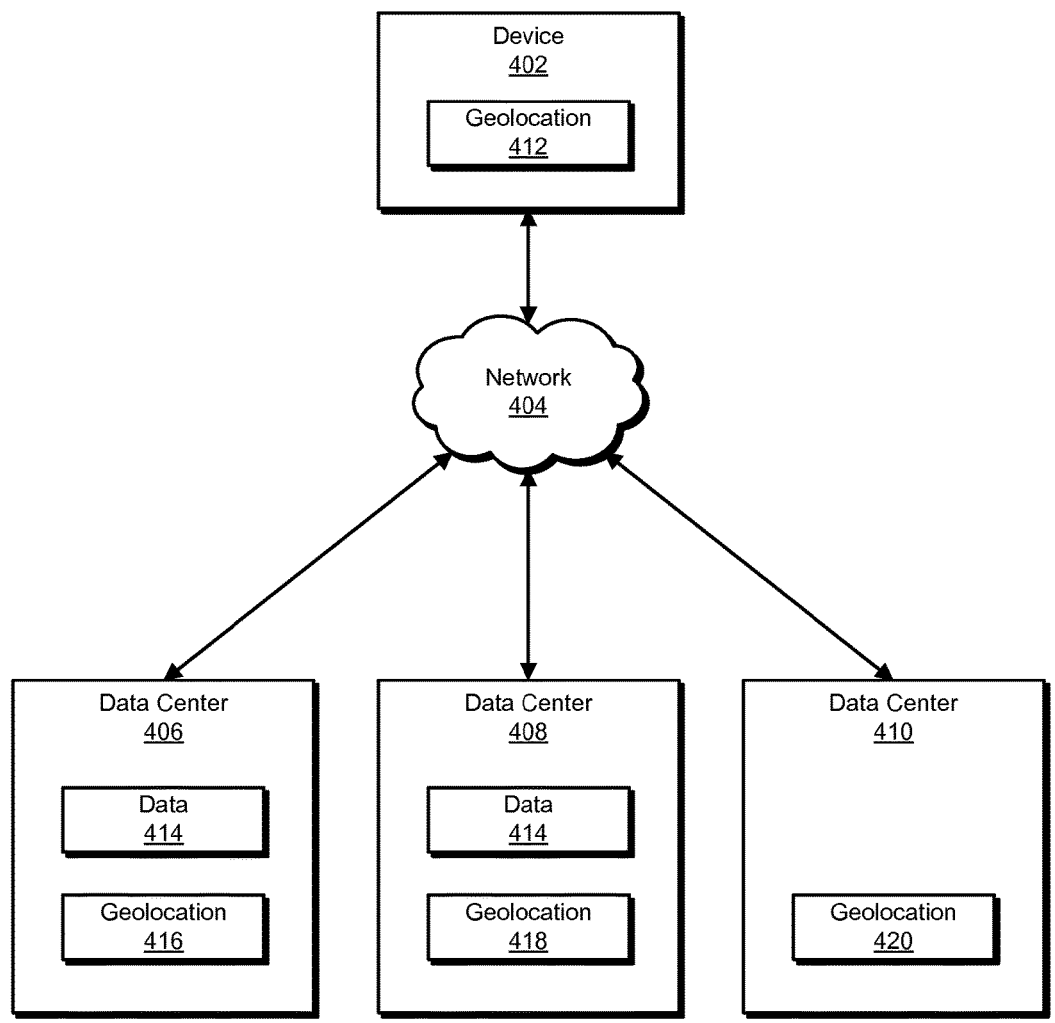
FIG. 4 is a block diagram of an exemplary computing system for sending push notifications that include preferred data center routing information.

The following will provide, with reference to FIGS. 1, 2, and 4, detailed descriptions of exemplary systems for sending push notifications that include preferred data center routing information. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for sending push notifications that include preferred data center routing information. As illustrated in this figure, exemplary system 100 may include one or more modules 102 for performing one or more tasks. For example, and as will be explained in greater detail below, exemplary system 100 may include a configuration module 104 that configures at least one rule for determining which data center out of a plurality of data centers is preferred to serve one or more download requests. Exemplary system 100 may additionally include an identification module 106 that identifies a push notification that is configured to prompt a device to download data from a data center within the plurality of data centers. Exemplary system 100 may also include a selection module 108 that uses the rule to select, from the plurality of data centers, a preferred data center to which to route the device. Exemplary system 100 may additionally include an embedding module 110 that embeds information about the preferred data center in the push notification sent to the device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a device 202 in communication with a data center system 206 via a network 204. In one example, data center system 206 may be programmed with one or more of modules 102.

In one embodiment, one or more of modules 102 from FIG. 1 may, when executed by at least one processor of data center system 206, send push notifications that include preferred data center routing information. For example, and as will be described in greater detail below, configuration module 104 may configure at least one rule 208 for determining which data center out of a plurality of data centers connected to data center system 206 is preferred to serve one or more download requests. At some later time, identification module 106 may identify a push notification 210 that is configured to prompt a device 202 to download data from a data center within the plurality of data centers. Next, selection module 108 may use rule 208 to select, from the plurality of data centers, a preferred data center 212 to which to route device 202. Finally, embedding module 110 may embed information about preferred data center 212 in push notification 210 sent to device 202.

Device 202 generally represents any type or form of computing device capable of reading computer-executable instructions. Examples of device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Data center system 206 generally represents any type or form of computing device or group of connected computing devices that is capable of serving data. In some embodiments, data center system 206 may include, without limitation, one or more data centers, traffic control systems, notification dispatch systems, and/or networks.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between device 202 and data center system 206.

FIG. 3 is a flow diagram of an exemplary computer-implemented method 300 for sending push notifications that include preferred data center routing information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may configure at least one rule for determining which data center out of a plurality of data centers is preferred to serve one or more download requests. For example, configuration module 104 may, as part of data center system 206 in FIG. 2, configure at least one rule 208 for determining which data center out of a plurality of data centers is preferred to serve one or more download requests.

The term "data center," as used herein, generally refers to any device or set of devices, physical or virtual, that may be used to store data and/or transmit. In some embodiments, a data center may include one or more facilities containing servers and related devices. In most embodiments, a data center may be located at a single physical location. In other embodiments, a data center may include virtualized servers and/or other virtual devices hosted in a variety of physical locations. Additionally or alternatively, a data center may include a mix of physical and virtual servers and/or other devices.

The term "download request," as used herein, generally refers to any message intended to trigger a transfer of data from a data center to a device. In some embodiments, a download request may be sent as a response to a push notification that informs the device that data is available for download. For example, a download request may be sent by a device that is attempting to sync a local copy of data with data hosted in a data center. In another example, a download request may be sent by a device that is attempting to access data stored remotely at a data center. Additionally or alternatively, a download request may be initiated by a server and/or service rather than a device (e.g., for data backup and/or replication purposes).

The term "rule," as used herein, generally refers to any description of conditions that might affect a data center and/or a device combined with a categorization of those conditions as positive or negative in regards to selecting a given data center to serve a download request. For example, a rule may specify that a data center must currently host the data to be downloaded at the time the push notification to download the data is sent and any data center that does not should never be selected and/or should be extremely negatively weighted. In another example, a rule may positively weight data centers based on physical closeness to the device but might not specify that the closest data center must always be selected. For example, a rule may specify that a combination of the closeness of the data center to the device and the available bandwidth of the data center should be used to select the preferred data center. In another example, a rule may require that a data center have a certain window of planned uptime from the time the push notification intended to trigger the download request is sent. For example, the rule may specify that a data center must not have planned downtime within the next hour after the push notification is sent and/or must not have experienced connectivity problems within the last hour before the push notification was sent.

Additionally or alternatively, a rule may specify that a device should not be directed to a data center that is located in a jurisdiction where the data to be downloaded cannot be legally hosted. For example, a user may be on vacation in a country where pornographic material is legally banned and may be attempting to sync pornographic data that may currently be hosted at their typical local data center, halfway across the world. In this example, the rule may prevent the data from being transferred to the closest data center and instead mandate either the device must be directed to the further away data center where the data is currently hosted or the data must be transferred to a data center in a nearby country with different laws and the device must be directed to the new data center.

Configuration module 104 may configure the rules in a variety of ways. For example, configuration module 104 may configure the rules by receiving input from an administrator. In another embodiment, configuration module 104 may configure the rules by receiving input from another application. In some embodiments, configuration module 104 may also configure an application on the device to parse preferred data center information from push notifications. In one embodiment, configuration module 104 may automatically configure the rules with a default configuration.

At step 304, one or more of the systems described herein may identify a push notification that is configured to prompt a device to download data from a data center within the plurality of data centers. For example, identification module 106 may, as part of data center system 206 in FIG. 2, identify push notification 210 that is configured to prompt device 202 to download data from a data center within the plurality of data centers.

The term "push notification," as used herein, generally refers to any message sent to a device from a service. In one embodiment, a push notification may be sent from a push notification dispatcher to a device. In another embodiment, a push notification may be sent from a data center to a device to notify the device that data is available at the data center. In some embodiments, a push notification may include information about data to be downloaded and/or the preferred data center from which to download the data. In some examples, a push notification may be sent because data has been modified at a data center and should be updated on a device. In some embodiments, a push notification may be different from a fetch request that may be sent from a device to a service, server and/or data center and that may request data from the service, server and/or data center.

Identification module 106 may identify the push notification in a variety of contexts. For example, identification module 106 may be part of a push notification dispatch service and may identify the push notification in the process of creating and/or dispatching the push notification. In another embodiment, identification module 106 may intercept a push notification that has been created by another service. For example, identification module 106 may be part of a centralized traffic management console and may intercept a push notification generated by a data center and/or notification generation service. Additionally or alternatively, identification module 106 may be part of a data center and may generate and/or intercept a push notification.

In some examples, the data at the data center may include a user's personal data. For example, a user may store data both on one or more devices and at a data center for backup and/or convenience purposes. In other examples, the data at the data center may include application data. For example, the data may include malware definitions and/or heuristics that have been updated at the data center and should be downloaded by the anti-malware program on a user's device. Additionally or alternatively, the data may include application updates, such as new versions of an application on a user's device.

At step 306, one or more of the systems described herein may use the rule to select, from the plurality of data centers, a preferred data center to which to route the device. For example, selection module 108 may, as part of data center system 206 in FIG. 2, use rule 208 to select, from the plurality of data centers, preferred data center 212 to which to route device 202.

Selection module 108 may use the rule to select the preferred data center in a variety of situations. As illustrated in FIG. 4, a push notification may be intended to prompt a device 402 to download data 414. In some examples, device 402 may be connected to data centers 406, 408, and/or 410 via network 404. In some examples, data centers 406 and/or 408 may host data 414 while data center 410 may not host data 414. In some embodiments, selection module 108 may determine that device 402 should not be directed to data center 410 because data center 410 does not currently host data 414. In one example, geolocation 416 of data center 406 may be closer to geolocation 412 of device 402 than geolocation 418 of data center 408. In this example, selection module 108 may select data center 406 due to geolocation 416 being the closest geolocation. In one example, geolocation 420 of data center 410 may be even closer than geolocation 416; however, selection module 108 may still not select data center 410 because data center 410 does not have data 414.

In another example, data center 408 may have more available bandwidth than data center 406. In some embodiments, selection module 108 may select data center 408 over data center 406 even if data center 406 is closer to device 402, because the rules may specify that the combination of location and available bandwidth offered by data center 408 is preferable to the combination of location and available bandwidth offered by data center 406. Additionally or alternatively, data center 406 may be suffering from connectivity issues and/or have upcoming planned downtime. In some examples, the rules may specify that the download requests for a certain geographic area should be split among local data centers in a certain proportion. For example, a rule may specify that 90% of traffic in the region should be sent to data center 406 and 10% of traffic should be sent to data center 408.

Returning to FIG. 3, at step 308, one or more of the systems described herein may embed information about the preferred data center in the push notification sent to the device. For example, embedding module 110 may, as part of data center system 206 in FIG. 2, embed information about preferred data center 212 in push notification 210 sent to device 202.

Embedding module 110 may embed the preferred data center information in a variety of ways. For example, embedding module 110 may embed the preferred data center information in a hypertext transfer protocol (HTTP) header of the push notification. In another embodiment, embedding module 110 may embed the information in the body of the push notification. Additionally or alternatively, embedding module 110 may embed the information in metadata sent with the push notification.

In some examples, the systems designed herein may configure the device to identify the information about the preferred data center embedded in the push notification and route one or more requests to download the data to the preferred data center identified in the push notification. Additionally or alternatively, the systems described herein may receive, at the preferred data center, a download request from the device for the data and may serve the download request from the device for the data via the preferred data center.

Figure 5:
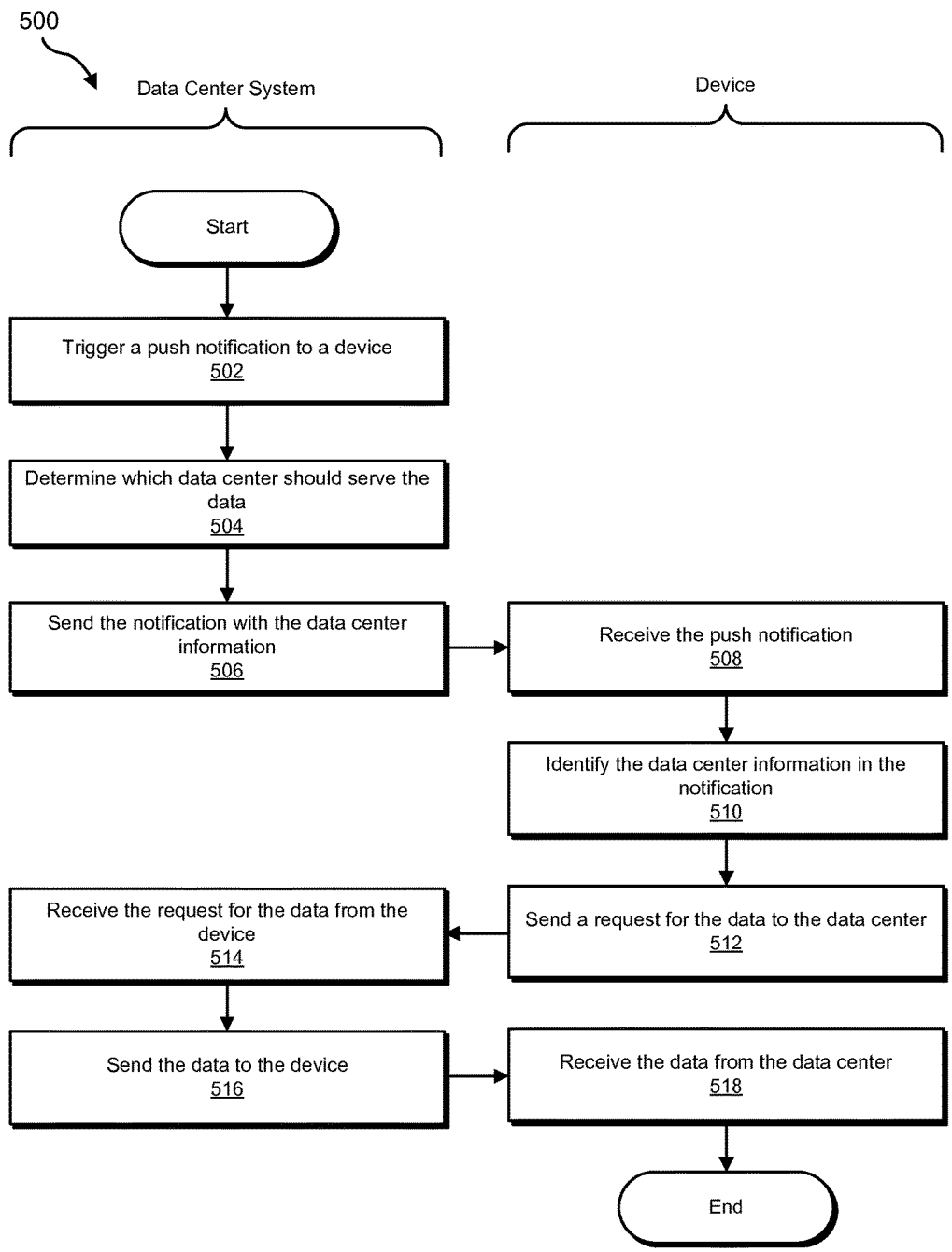
FIG. 5 is a flow diagram of an exemplary method for sending push notifications that include preferred data center routing information.

In some embodiments, the systems described herein may be hosted on multiple systems and/or devices, as illustrated in FIG. 5. FIG. 5 is a block diagram of an exemplary computing system 500 for sending push notifications that include preferred data center routing information. At step 502, some part of a data center system may trigger a push notification. In one embodiment, the data center itself may trigger the push notification in response to a change in the data hosted on the data center. In some examples, the data center that triggers the notification may not be the preferred data center. For example, a data center may trigger the notification, but may be experiencing connectivity issues and thus may not be the optimal data center to serve the data. In another example, a data center that is usually nearest to the device may trigger a notification, but owner of the device may be traveling and the device may currently be located far away from the data center. In another embodiment, a push notification dispatch service may trigger the push notification. In some embodiments, the systems described herein may trigger the push notification at a predetermined interval (e.g., a push notification may be sent to the device once per day to prompt the device to sync).

At step 504, the systems described herein may determine which data center should serve the data. In some embodiments, the data center that hosts the data and/or triggered the push notification may determine which data center should serve the data. In other embodiments, a centralized traffic management console may determine which data center should serve the data. At step 506, the systems described herein may send the notification with the preferred data center information to the device. In some embodiments, a push notification dispatch service may send the notification. In other embodiments, the preferred data center may send the push notification. Additionally or alternatively, a centralized traffic management console may send the push notification.

At step 508, the device may receive the push notification. In some embodiments, the device may send the download request without soliciting input from the user. In other embodiments, the device may display the push notification to the user. At step 510, the device may identify the data center information in the notification. In some embodiments, the device may be specially configured to recognize data center information in push notification. For example, the device may parse HTTP headers in order to detect preferred data center information. At step 512, the device may send a request for the data to the data center. In some embodiments, the device may be configured to send requests for data directly to the preferred data center suggested by the push notification. In other embodiments, the device may embed information about the preferred data center in the request and may send the request to a centralized traffic management console that may then direct the request to the preferred data center.

At step 514, the data center system may receive the request for data from the device. In some embodiments, a centralized traffic management console may receive the request and route the request to the preferred data center. In another embodiment, the preferred data center may receive the request for data directly from the device. At step 516, the data center system may send the data to the device. At step 518, the device may receive the data from the data center. In some examples, the data on the device may now be synchronized with the data in the data center.

As explained in connection with method 300 in FIG. 3 above, the systems and methods described herein may direct devices to preferred data centers via push notifications. The systems described herein may use a variety of factors to assess a data center's suitability, such as health, bandwidth, presence of the data to be downloaded, location, planned downtime, and/or local laws. Once the preferred data center has been determined, the systems described herein may embed information about the preferred data center into a push notification sent to the device. The device may parse the data center information in the notification and may direct the download request triggered by the notification to the preferred data center. By using a push notification dispatch service and/or traffic management console to determine the optimal data center, rather than a global and/or local traffic manager, the systems described herein may route download requests to data centers that will be able to quickly, reliably, and efficiently provide devices with the requested data. Routing the download request to a data center that is nearby, stable, has available bandwidth, and has the data to be downloaded improves the push flow from a user perspective and saves resources that might otherwise be spent on moving data between data centers, transmitting data over long distances, and/or re-establishing connections interrupted by downtime or poor connectivity.

Figure 6:
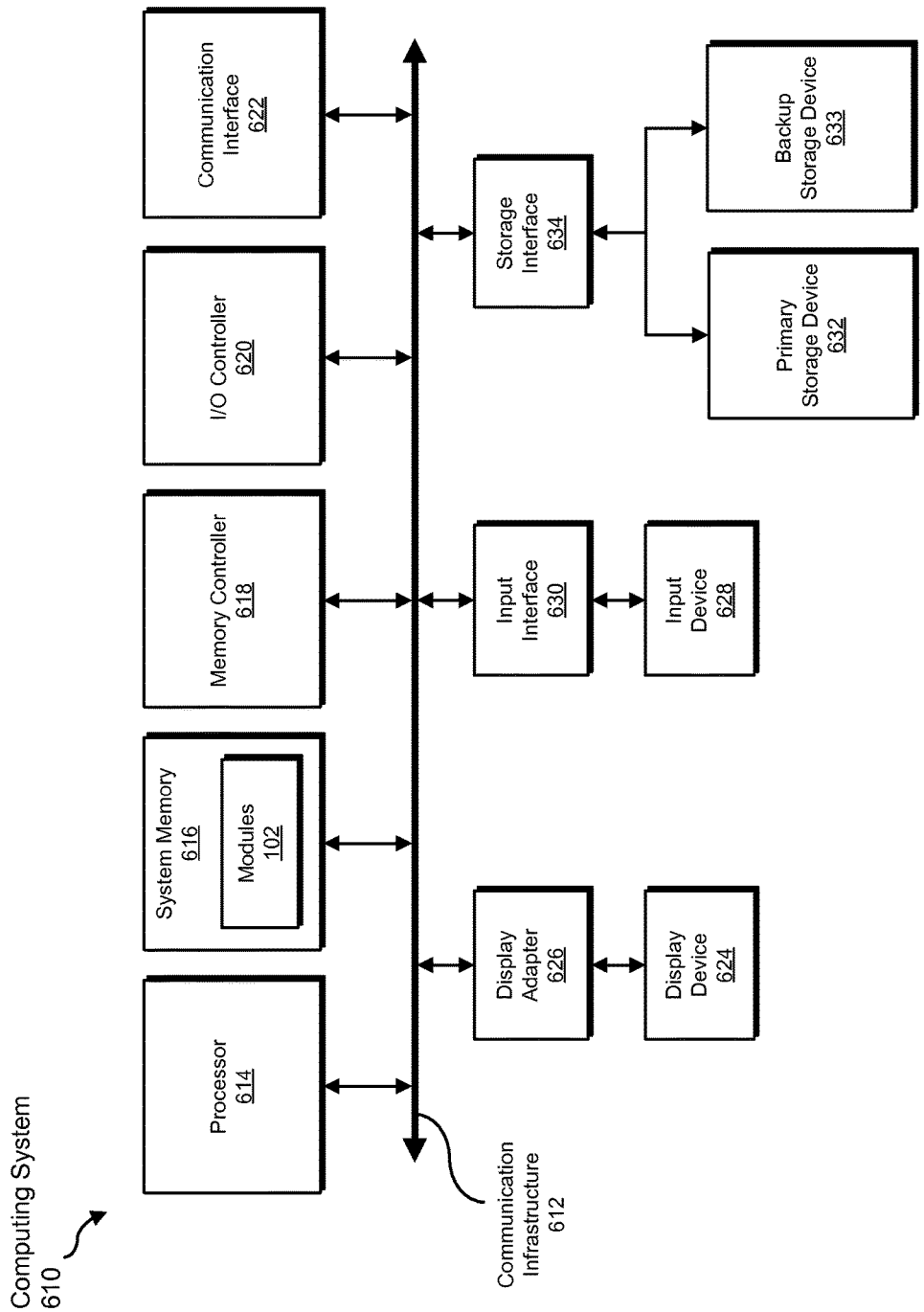
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
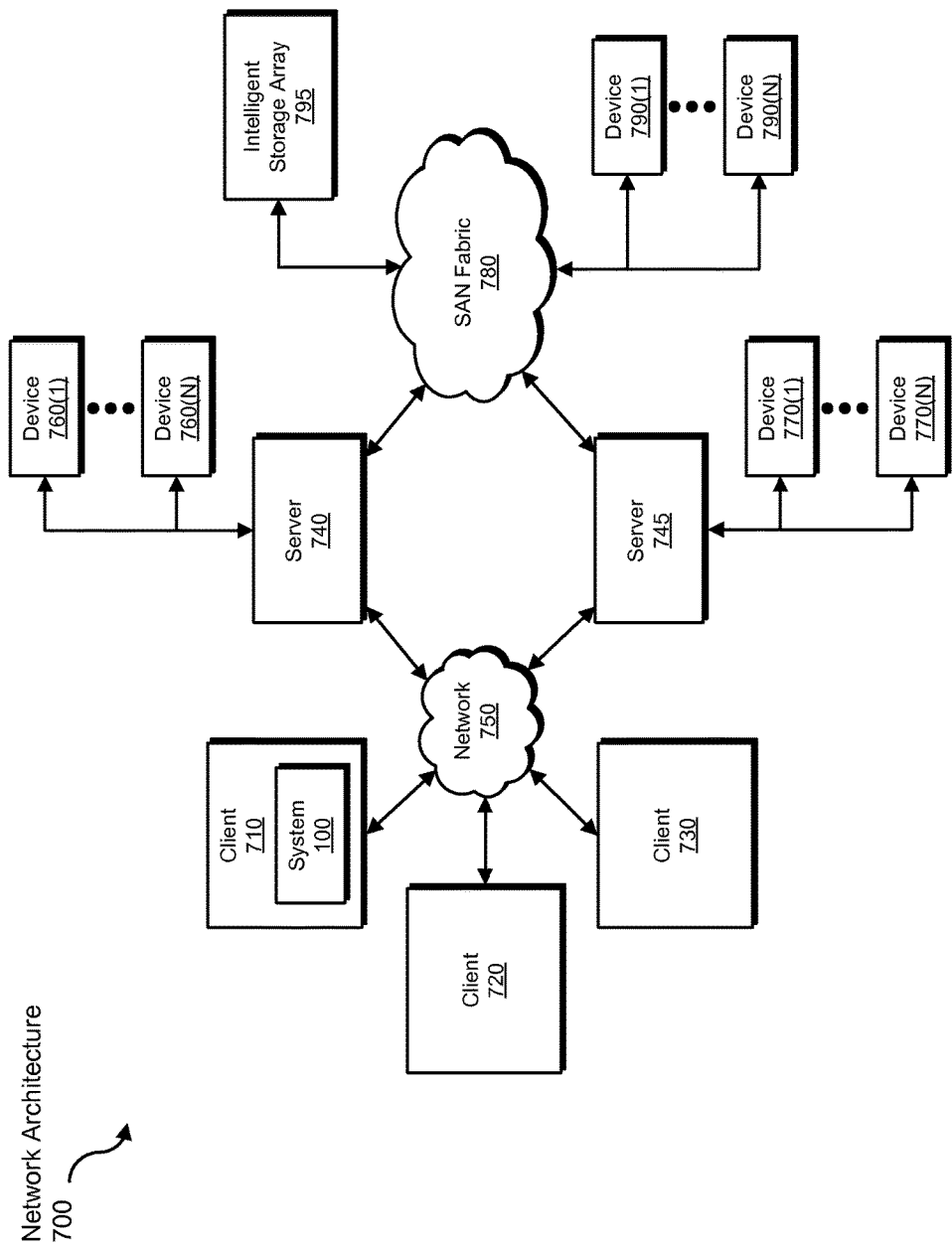
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for sending push notifications that include preferred data center routing information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data center information to be transformed, transform the data center information into a relative efficiency rating for one or more data centers, output a result of the transformation to a module that determines which data center is preferred, use the result of the transformation to select a data center to which to route a device, and store the result of the transformation to a push notification. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for sending push notifications that include preferred data center routing information, at least a portion of the method being performed by a data center computing device comprising at least one processor, the method comprising:

configuring at least one rule for determining which data center out of a plurality of data centers is preferred to serve one or more download requests, wherein the rule specifies a combination of a location from a client device and available bandwidth for a preferred data center;

identifying a push notification that is configured to prompt a client device to download data from a data center within the plurality of data centers;

using the rule to select, from the plurality of data centers, the preferred data center to which to route the client device, wherein, from among the plurality of data centers, a next closest data center to the client device is selected as the preferred data center over a closest data center to the client device when the next closest data center has a greater available bandwidth;

using the rule to specify, based on connectivity issues associated with the closest data center, that the download requests, for a predetermined geographic area, are sent to both the preferred data center and the closest data center, wherein the download requests are split among the closest data center and the preferred data center such that a predefined percentage representing a majority of data traffic in the predetermined geographic area is sent to the preferred data center and a predefined percentage representing a minority of the data traffic is sent to the next closest data center; and embedding information about the preferred data center in the push notification sent to the client device.

2. The computer-implemented method of claim 1, wherein configuring the rule for determining which data center is preferred further comprises configuring a rule that specifies that the preferred data center is required to host the data to be downloaded by the client device at the time the push notification is received.

3. The computer-implemented method of claim 1, wherein:
configuring the at least one rule further comprises configuring a rule that takes into account physical proximity between data centers and client devices; and
identifying the push notification that is configured to prompt the client device to download the data comprises determining a geolocation of the client device.

4. The computer-implemented method of claim 1, wherein configuring the rule for determining which data center is preferred further comprises configuring a rule that specifies a minimum available bandwidth for the preferred data center during a predetermined window of time surrounding an expected time of a download request for the data from the client device.

5. The computer-implemented method of claim 1, further comprising configuring the client device to:
identify the information about the preferred data center embedded in the push notification; and
route one or more requests to download the data to the preferred data center identified in the push notification.

6. The computer-implemented method of claim 1, further comprising:
receiving, at the preferred data center, a download request from the client device for the data; and
serving the download request from the client device for the data via the preferred data center.

7. The computer-implemented method of claim 1, wherein using the rule to select the preferred data comprises determining, at a data center that identified the push notification, which data center is the preferred data center.

8. The computer-implemented method of claim 1, wherein using the rule to select the preferred data center comprises at least one of:
determining, at a centralized traffic management console, which data center is the preferred data center; and
determining, at a push notification dispatch service, which data center is the preferred data center.

9. A system for sending push notifications that include preferred data center routing information, the system comprising:
a configuration module, stored in memory, that configures at least one rule for determining which data center out of a plurality of data centers is preferred to serve one or more download requests, wherein the rule specifies a combination of a location from a client device and available bandwidth for a preferred data center;
an identification module, stored in memory, that identifies a push notification that is configured to prompt a client device to download data from a data center within the plurality of data centers;
a selection module, stored in memory, that uses the rule:
to select, from the plurality of data centers, the preferred data center to which to route the client device, wherein, from among the plurality of data centers, a next closest data center to the client device is selected as the preferred data center over a closest data center to the client device when the next closest data center has a greater available bandwidth; and
to specify, based on connectivity issues associated with the closest data center, that the download requests, for a predetermined geographic area, are sent to both the preferred data center and the closest data center, wherein the download requests are split among the closest data center and the preferred data center such that a predefined percentage representing a majority of data traffic in the predetermined geographic area is sent to the preferred data center and a predefined percentage representing a minority of the data traffic is sent to the next closest data center;
an embedding module, stored in memory, that embeds information about the preferred data center in the push notification sent to the client device; and
at least one physical processor configured to execute the configuration module, the identification module, the selection module, and the embedding module.

10. The system of claim 9, wherein the configuration module further configures the rule for determining which data center is preferred by configuring a rule that specifies that the preferred data center is required to host the data to be downloaded by the client device at the time the push notification is received.

11. The system of claim 9, wherein:
the configuration module further configures the at least one rule by configuring a rule that takes into account physical proximity between data centers and client devices; and
the identification module identifies the push notification that is configured to prompt the client device to download the data by determining a geolocation of the client device.

12. The system of claim 9, wherein the configuration module further configures the rule for determining which data center is preferred by configuring a rule that specifies a minimum available bandwidth for the preferred data center during a predetermined window of time surrounding an expected time of a download request for the data from the client device.

13. The system of claim 9, wherein the configuration module configures the client device to:
identify the information about the preferred data center embedded in the push notification; and
route one or more requests to download the data to the preferred data center identified in the push notification.

14. The system of claim 9, further comprising:
a reception module, stored in memory, that receives, at the preferred data center, a download request from the client device for the data; and
a serving module, stored in memory, that serves the download request from the client device for the data via the preferred data center.

15. The system of claim 9, wherein the selection module uses the rule to select the preferred data by determining, at a data center that identified the push notification, which data center is the preferred data center.

16. The system of claim 9, wherein the selection module uses the rule to select the preferred data center by at least one of:
determining, at a centralized traffic management console, which data center is the preferred data center; and
determining, at a push notification dispatch service, which data center is the preferred data center.

17. A non-transitory computer-readable medium comprising one or more computer-readable instructions that, when executed by at least one processor of a data center computing device, cause the data center computing device to:
configure at least one rule for determining which data center out of a plurality of data centers is preferred to serve one or more download requests, wherein the rule specifies a combination of a location from a client device and available bandwidth for a preferred data center;

identify a push notification that is configured to prompt a client device to download data from a data center within the plurality of data centers;

use the rule to select, from the plurality of data centers, the preferred data center to which to route the client device, wherein, from among the plurality of data centers, a next closest data center to the client device is selected as the preferred data center over a closest data center to the client device when the next closest data center has a greater available bandwidth;

use the rule to specify, based on connectivity issues associated with the closest data center, that the download requests, for a predetermined geographic area, are sent to both the preferred data center and the closest data center, wherein the download requests are split among the closest data center and the preferred data center such that a predefined percentage representing a majority of data traffic in the predetermined geographic area is sent to the preferred data center and a predefined percentage representing a minority of the data traffic is sent to the next closest data center; and embed information about the preferred data center in the push notification sent to the client device.

18. The non-transitory computer-readable medium of claim 17, wherein the one or more computer-readable instructions further cause the data center computing device to configure the rule for determining which data center is preferred by configuring a rule that specifies that the preferred data center is required to host the data to be downloaded by the client device at the time the push notification is received.

19. The non-transitory computer-readable medium of claim 17, wherein the one or more computer-readable instructions further cause the data center computing device to:

configure the at least one rule by configuring a rule that takes into account physical proximity between data centers and client devices; and identify the push notification that is configured to prompt the device to download the data by determining a geolocation of the client device.

20. The non-transitory computer-readable medium of claim 17, wherein the one or more computer-readable instructions further cause the data center computing device to configure the rule for determining which data center is preferred by configuring a rule that specifies a minimum available bandwidth for the preferred data center during a predetermined window of time surrounding an expected time of a download request for the data from the client device.

* * * * *